United States Patent
Artzt et al.

(10) Patent No.: US 8,402,035 B2
(45) Date of Patent: Mar. 19, 2013

(54) METHODS AND SYSTEMS FOR DETERMING MEDIA VALUE

(75) Inventors: Greg Artzt, Weddington, NC (US); Mark Fasciano, Port Washington, NY (US); Steve Skiena, Setauket, NY (US); Levon Lloyd, Patchogue, NY (US)

(73) Assignee: General Sentiment, Inc., Jericho, NY (US)

( * ) Notice: Subject to any disclaimer, the term of this patent is extended or adjusted under 35 U.S.C. 154(b) by 0 days.

(21) Appl. No.: 13/047,527

(22) Filed: Mar. 14, 2011

(65) Prior Publication Data
US 2011/0225174 A1 Sep. 15, 2011

Related U.S. Application Data

(60) Provisional application No. 61/313,342, filed on Mar. 12, 2010.

(51) Int. Cl.
*G06F 17/30* (2006.01)

(52) U.S. Cl. ......... 707/750; 707/709; 707/730; 707/769

(58) Field of Classification Search .................. 707/709, 707/730, 750, 769
See application file for complete search history.

(56) References Cited

U.S. PATENT DOCUMENTS

| | | | |
|---|---|---|---|
| 7,974,983 B2 * | 7/2011 | Goeldi | 707/769 |
| 2006/0174261 A1 * | 8/2006 | Cline et al. | 725/20 |
| 2008/0010144 A1 * | 1/2008 | Chatwin et al. | 705/14 |
| 2009/0030785 A1 * | 1/2009 | Goyal et al. | 705/14 |
| 2009/0271309 A1 * | 10/2009 | Gordon et al. | 705/37 |
| 2010/0242060 A1 * | 9/2010 | Liu et al. | 725/9 |
| 2010/0325125 A1 * | 12/2010 | Bomfim et al. | 707/759 |

* cited by examiner

Primary Examiner — John E Breene
Assistant Examiner — Andalib Lodhi
(74) Attorney, Agent, or Firm — Cooper & Dunham LLP

(57) ABSTRACT

Exemplary embodiments are directed to determining a media value associated mentions of an entity in one or more documents based on a sentiment attributed to the mentions of the entity and/or a frequency with which the entity is mentioned. Exemplary embodiments can include a media value engine that can identify mentions of an entity in documents, attribute sentiment to the mentions of the entity; determine a polarity of the sentiment, and calculate a media value attributed to the entity based on the sentiment.

16 Claims, 8 Drawing Sheets

Figure 6

METHODS AND SYSTEMS FOR DETERMING MEDIA VALUE

CROSS-REFERENCE TO RELATED APPLICATIONS

This application claims priority to U.S. Provisional Application No. 61/313,342, filed Mar. 12, 2010, the contents of which are hereby incorporated by reference in their entirety.

BACKGROUND

1. Technical Field

Embodiments disclosed herein are directed to determining media value associated with entities of interest mentioned in one or more documents.

2. Brief Discussion of Related Art

Typically entities, such as corporations, are willing to pay a fee to advertise to gain exposure to a target recipient. For example, entities may pay to include an advertisement in a magazine, newspaper, webpage, and the like. Today, entities are being mentioned across the Internet, in news, blogs, tweets, and other social media. This "buzz" can be created by product launches, ad campaigns, PR events, earnings reports, a single consumer's product experience, and many other triggers, even scandals. Many times, this buzz is unsolicited by the entity and/or occurs without requiring the entity to pay a fee. For example, a product manufactured by an entity can be included in a product review article, an article can discuss financial statements of the entity, and the like. Such mentions or occurrences can have advertising or marketing value. For example, if a product review is negative, the value of the product review to the entity may be negative or in some instances may be considered positive. Likewise, if the product review is positive, the value of the product review to the entity may be positive. Taking this value into account can aid in optimizing marketing strategies.

As such, it would be desirable to attribute a media value to the mentions or occurrences of entities in documents based on whether the mentions or occurrences reflect negative or positive sentiment.

SUMMARY

In one aspect, a method of determining media value of an entity of interest is disclosed. The method includes calculating a media value based on a frequency of instances of the entity included in the one or more computer documents.

In another aspect, a non-transitory computer readable medium storing instructions executable by a computing system including at least one computing device is disclosed. Execution of the instructions implements a method for determining media value of an entity of interest that includes calculating a media value based on the sentiment associated with the instances of the entity of interest included in the one or more computer documents.

In yet another aspect, a system for determining media value of an entity of interest is disclosed. The system can include a computing system having one or more computers. The computing system is configured to calculate a media value based on the sentiment associated with the instances of the entity of interest included in the one or more computer documents.

In still another aspect, a method of determining media value of an entity of interest is disclosed. The method includes identifying mentions of an entity in one or more documents, attributing a sentiment to the mentions, determining a polarity of the sentiment, the polarity being negative or positive, and calculating a media value based on the sentiment attributed to the entity included in the one or more computer documents.

Other objects and features will become apparent from the following detailed description considered in conjunction with the accompanying drawings. It is to be understood, however, that the drawings are designed as an illustration only.

BRIEF DESCRIPTION OF THE DRAWINGS

FIG. 6 is an exemplary document that has been marked-up by an embodiment of the MV engine.

DETAILED DESCRIPTION

Exemplary embodiments are directed to determining media value corresponding to an entity based on a frequency with which the entity is mentioned in one or more documents and/or based on sentiment attributed to the entity in one or more documents. Embodiments can scour and analyze sources of content 'listening' in real-time to the mentions of brands, products, politicians, celebrities, companies, and the like, and can calculate media value based on these mentions.

Exemplary embodiments can include a media value engine, which can process the one or more documents to identify entities of interest, determine sentiment associated with occurrences of the identified entities in the documents, determine a polarity associated with the sentiment, and calculate a media value for the identified entities using, at least in part, the frequency with which the entity is mentioned in the documents, the sentiment, and/or a polarity of the sentiment identified in the documents. Embodiments of the media value engine can generate an output for an entity, such as a media value report, a dashboard display in a web-based user interface, or other suitable output, which includes the calculated media value for the entity.

As used herein, "media value" refers to an economic value or financial value, such as an amount of currency including, for example, dollars, Euros, pounds, Yen, and the like, attributed to the mentions or occurrences of an entity in one or more documents. As one example, media value can represent the advertising purchase-equivalent value of an entity's media exposure across the web. Using a frequency with which an entity is mentioned and/or a sentiment associated with the mentions as weighting metrics, embodiments of the media value engine can estimate what it would have cost to attract the same media exposure through traditional advertising channels.

Figure 1:
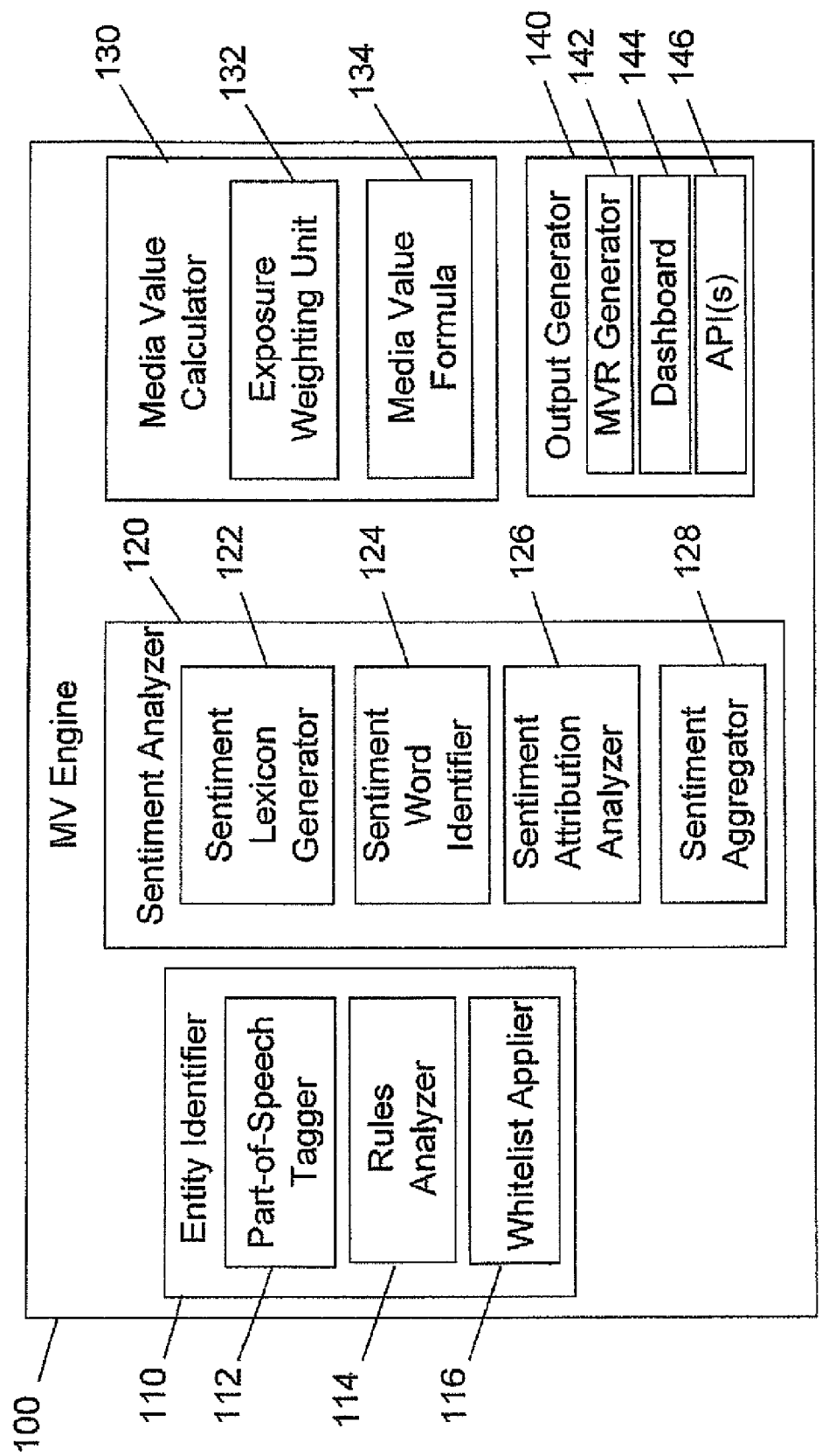
FIG. 1 depicts a block diagram illustrating an exemplary embodiment of a media value (MV) engine.

FIG. 1 depicts a block diagram of a media value (MV) engine 100. The MV engine 100 collects a corpus of computer documents and identifies mentions (e.g., occurrences) of entities in the corpus. An entity can be a name for a given person, place, or thing. For example, an entity can be a name of a person, a company, a consumer brand, a product, a service, a university, a city, a state, a country, and the like. A corpus can refer to classes of document sources from which documents can be collected. A corpus can include one or more document sources, such as social media postings in a social networking site, microblogging websites, news media articles published by news media websites, press releases published by entities on their website or through other channels, and the like. Each document source can include one or more documents. Mentions or occurrences of an entity in a document can refer to instances of the entity included in the document, such as the name of the entity, where each instance of the entity in the document is a mention or occurrence of the entity in the document.

The MV engine 100 identifies sentiment and a polarity of the sentiment expressed in the documents and can determine a number of people to whom the document is distributed or exposed. Sentiment can refer to a manifestation of an opinion, fact, emotion, attitude, bias, and the like, in a document, which may solicit an interpretation, reaction, response, and the like, from a viewer/observer of the sentiment. The sentiment can have an associated polarity that can be indicative of the likely or anticipated interpretation, reaction, response, and the like, of a viewer of the sentiment. For example, sentiment can have a positive polarity indicating that the sentiment is favorable for the entity associated with the sentiment, a negative polarity indicating that the sentiment is unfavorable for the entity associated with the sentiment, or a neutral polarity indicating that the sentiment is not positive or negative. A value can be assigned to the sentiment based on whether the polarity of the sentiment is positive or negative. In some embodiments, the value assigned to the sentiment can be weighted to give more or less value to sentiment based on a degree of the polarity. In some instances, while the polarity of the sentiment can be negative, the negative sentiment can have a positive, neutral, or negative effect on the media value. Thus, the MV engine 100 can be configured based on the notion that any exposure is valuable exposure. For example, an entity may consider any mention, negative or positive, as having some positive media value.

For each entity identified in the corpus of documents, the MV engine 100 stores an amount of sentiment expressed, a polarity for the sentiment, a date of publication for each document, an amount of exposure of a document source from which the documents were obtained, and the like. The MV engine 100 can maintain a media value (MV) database in which the sentiment that has been attributed to one or more entities is stored for each document source in the corpus and each day that has been processed. The media value for an entity identified in the documents can be calculated based on a total sentiment expressed towards the entity from each source in the corpus and/or a frequency with which the entity is mentioned in the documents (e.g., a number of times the entity is mentioned in a document), as well as a total exposure of each source. Media value can refer to an economic value or financial value, such as an amount of currency including, for example, dollars, Euros, pounds, Yen, and the like, attributed to the mentions or occurrences of the entity in the document sources. The media value can be expressed as a cumulative value for the documents in the corpus, per document source, per document, and like. The MV engine 100 includes an entity identifier 110, a sentiment analyzer 120, a media value (MV) calculator 130, and an output generator 140.

The entity identifier 110 identifies mentions, occurrences, or instances of entities in a document. An entity can be a member of a category of interest (e.g. "John Smith" is a member of the category of interest "person"; "General Sentiment" is a member of the category of interest "corporation"). Categories of interest can include people, geographic locations, consumer brands, products, services, companies, universities, and the like. The entity identifier 110 can receive a document from the corpus of documents as an input and can produce an output identifying occurrences of entities that are found in the document. The output of the entity identifier can be a marked-up version of the document in which the occurrences of the entity can be highlighted using tagging, changes in the color of the text, changes in the size of the text, changes in the font of the text, and the like. The entity identifier 110 can include a part-of-speech tagger 112, a natural-language rules analyzer 114 (hereinafter "rules analyzer 114"), and a white-list applier 116.

The part-of-speech tagger 112 can identify a part-of-speech for the words in the document received by the entity identifier 110. For example, based on historical usage patterns (e.g., "dog" is usually a noun, while "fast" can be a noun, verb, or adjective) and common patterns of part-of-speech usage, the part-of-speech tagger 112 outputs a part-of-speech for each word in the document. The part-of-speech tagger 112 can generate a marked-up version of the document in which the part-of-speech tagger 112 can append the part-of-speech to the end of each word in the document. The part-of-speech can be appended to each word as a tag, such as a mark-up language tag.

Once the part-of-speech for the words in the document have been determined, the rules analyzer 114 can group words of a document together to identify entities based on a set of pre-determined patterns. The rules analyzer 114 can include a set of rules that can be used by the rules analyzer 114 to identify entities having a name composed of more than one word. The set of rules can be based on parts-of-speech identified by the parts-of-speech tagger 112. As one example, the rules analyzer can include a rule such that when the word "University" appears in a document, followed by the words "of" or "at", followed by a sequence of proper nouns, such as "Southern California", the rules analyzer combines the words as a single entity (e.g., University of Southern California) and identifies the words as a mention or occurrence of the single entity. The rules analyzer 114 applies the rules to each sentence in the document to identify entities. The rules analyzer 114 can generate a marked-up the version of the document received from the part-of-speech tagger 112. The occurrences of the entity identified using the rules analyzer 114 can be highlighted using tagging, changes in the color of the text, changes in the size of the text, changes in the font of the text, and the like.

The white-list applier 116 of the entity identifier 110 can facilitate automatic recognition of entities in the documents. The white-list applier 116 can include a set of words and/or phrases representing the names of entities to be automatically recognized in the documents. The white-list applier 116 can ensure that occurrences of specific entities in documents are identified and can facilitate identification of entities included in the list without requiring the part-of-speech tagger 112 and/or the rules analyzer 114 to detect the entities. Thus, the white-list applier can be used in combination with the part-of-speech tagger 112 and the rules analyzer 114 to identify some or all of the entities mentioned in the documents. The white-list applier 116 can scan the document for instances of the entries in the list and can compare the words and/or phrases in the list to the words and/or phrases in the document, and when a word or phrase in the document matches a word and/or phrase in the list, the white-list applier 116 can identify the word and/or phrase in the document as a name of an entity. The white-list applier 116 can generate a marked-up version of the document, or can mark-up the version of the document output by the part-of-speech tagger 112 and/or rules analyzer 114, in which the entities identified by the white-list applier 116 can be can be highlighted using tagging, changes in the color of the text, changes in the size of the text, changes in the font of the text, and the like.

The sentiment analyzer 120 can identify sentiment expressed in a document, a polarity of the sentiment, and entities to which the sentiment is directed. The sentiment analyzer 120 can use natural language processing to identify the sentiment expressed in a document and can determine an amount of sentiment attributed to each entity identified in a document. For example, the sentiment analyzer 120 can identify a cumulative amount of sentiment having a positive polarity and a negative polarity in a document. The sentiment analyzer 120 can receive the marked-up version of the document output by the entity identifier 110 as an input and can output the sentiment expressed towards each entity identified in the document. The sentiment analyzer 120 includes a sentiment lexicon generator 122, a sentiment word identifier 124, a sentiment attribution analyzer 126, and a sentiment aggregator 128. Those skilled in the art will recognize that sentiment in a document can be identified using other techniques and that sentiment identification is not limited to the illustrative embodiments described herein.

The sentiment lexicon generator 122 can generate a lexicon of sentiment words and/or phrases using a computer dictionary of synonym/antonym relationships between words and/or phrases. In some embodiments, a small seed set of positive and negative sentiment words can be used to derive the lexicon of sentiment words. In some embodiments, sentiment lexicon generation by the sentiment lexicon generator 122 can use path analysis. Expanding seed lists into lexicons can be performed using recursive querying for synonyms using a computer dictionary. The sentiment lexicon generator can expand a set of seed words using synonym and antonym queries. A polarity (positive or negative) can be associated with the words and/or phrases in the sentiment lexicon and synonyms and antonyms of the words and/or phrases can be identified. Synonyms of a word and/or phrase inherit the polarity from the parent, whereas antonyms of the word and/or phrase inherit the opposite polarity.

The sentiment word identifier 124 receives the document from the entity identifier 110 and the sentiment lexicon generated by a sentiment lexicon generator 122 as an input and outputs the identified sentiment words and/or phrases based on the sentiment lexicon along with any associated modifiers, such as, for example, "not", "very", and the like, which can modify the sentiment (e.g. "not" reverses polarity, "very" magnifies sentiment). For example, the sentiment word identifier 124 can compare words and/or phrases in the sentiment lexicon to words and/or phrases in the document. The words indicating sentiment can be identified by marking-up the document.

The sentiment attribution analyzer 126 receives the document with the identified entities and sentiment in the marked-up document and attributes the identified sentiment to the entities. In some embodiments, the sentiment attribution analyzer 126 attributes sentiment in a sentence to all entities identified in the sentence. In some embodiments, sentiment can be attributed to an instance of an entity occurring closest to the sentiment (e.g., the entity with the least number of words between the sentiment and the instance of the entity).

The sentiment aggregator 128 enters an entry in the MV database representing an amount of sentiment towards entities encountered in the document, along with a date the document was published and the source that published the document. In some embodiments, the sentiment aggregator 128 can sum the number of positive sentiment words attributed to an entity in the document and can subtract the number of negative sentiment words attributed to the entity in the document from the sum. In some embodiments, negative sentiment words that have a negative effect on the media value can be subtracted from the sum of the number of positive sentiment words. In some embodiments, negative sentiment words that have a positive effect on the media value can be added to the sum of the positive sentiment words.

The MV calculator 130 calculates media value associated with exposure of an entity based on results of the entity identifier 110 and sentiment analyzer 120 including, but not limited to occurrences of the entity in the document, a sentiment (and polarity of the sentiment) attributed to the occurrences, an amount of exposure or distribution the documents have, and the like. The MV calculator 130 can query the MV database for the results of entity identification and sentiment analysis. Using this, the MV calculator 130 can produce a total or cumulative media value for the entity and can calculate the media value associated with the corpus of documents, each of the document sources, each of the documents, and the like. The MV calculator 130 can include an exposure weighting unit 132 and a calculation unit 134.

The exposure weighting unit 132 can determine a number of people to which a document has been distributed or exposed. A document is distributed or exposed to a person when it is e-mailed to the person, tweeted to the person, accessed by a person via a browser, downloaded, or otherwise made available to the person. Distribution or exposure of classes of sources can be measured in different ways to determine the amount of people to which a particular document from that source is exposed. For example, traditional news media sources measure physical circulation; web-based sources can be measured using a number of hits a website receives, an Alexa rank, and the like; and micro-blog sources, such as Twitter, can be measured by the number of followers a source has. The exposure weighting unit 132, examines one or more of these types of measures and produces as an output, for each particular document in a class of sources, an approximation of the number of people to which a document of a particular source is distributed or exposed.

To generate the media value associated with a specified entity, during a specified time period, in a specified corpus of documents, the number of mentions, the sentiment polarity of those mentions, and the exposure weighting of those sources, during the specified time period, in the specified corpus, can be extracted from the MV database. For each source in the corpus, the media value for the specified entity, in the specified date range is calculated according to the following mathematical expression:

$$\text{media value} = ((rw^*\text{ref(entity)}) + (nw^*\text{neg\_ref(entity)}) + (pw^*\text{pos\_ref(entity)}))^*(\text{exposure(source)}^*\text{dollars/eyeball}),$$

where:

rw refers to the weight assigned by a user to an entity identified in the corpus of documents;

nw refers to the weight assigned by the user to a negative polarity for the entity identified in the corpus;

pw refers to the weight assigned by the user to a positive polarity entity identified in the corpus;

ref(entity) refers to a total number of references to the specified entity in the given source during the given date range, which is extracted from the database and calculated in the sentiment analyzer;

neg_ref(entity) refers to a total number of references with negative sentiment polarity to the specified entity in the given source during the given date range, which is extracted from the database and calculated in the sentiment analyzer;

pos_ref(entity) refers to a total number of references with positive sentiment polarity to the specified entity in the given source during the given date range, which is extracted from the database and calculated in the sentiment analyzer;

exposure(source) refers to the number of people that a document published in the given source is exposed to, which is extracted from the database, and calculated in the exposure weighting unit;

dollars/eyeball refers to the amount of money, specified by the user, that the user values for the specified entity being exposed to one person, from the specified corpus;

the expression rw*ref(entity) can be referred to as a weighted reference value;

the expression nw*neg_ref(entity) can be referred to as a negative entity reference value;

the expression pw*pos_ref(entity) can be referred to as a positive entity reference value; and the expression exposure(source)*dollars/eyeball can be referred to as a media value multiplier.

The cost of advertisements can be a function of the number of readers on the given media channel (a specific newspaper, website, blog, etc.), which can be expressed in terms of "cost per thousand" or similar quantities. The dollars/eyeball value can be determined based on published and estimated advertising rates for published or online advertisements (e.g. per thousand hits/impressions). Thus, different document sources may have different advertising rates.

The output generator 140 generates and outputs media value to users. For example, the output generator 140 can include a media value report generator 142 that generates media value reports (MVRs) based on the result of media value calculations, in response to user queries, a user interface or dashboard 144 that can be accessed by a user to view media value as well as other information attributed to one or more entities, and/or one or more application program interfaces (APIs) 146 that allows users to interface with the output generator using one or more applications. The output generator 140 takes as input the desired entities and time frame from the user and outputs media value attributed to the desired entities. The time frame can be specified as a range of dates, such as Oct. 15, 2009 to Jan. 10, 2010, or can be specified relative to the current date, such as yesterday, last week, last year, month-to-date, year-to-date, and the like. In some embodiments, the output can contain a total amount of media value for the entity during the specified time range; a time series showing the amount of media value for each day during the specified time range; a list of sources that contributed to the media value for the specified entity, during the specified time range, ordered by the amount of media value contributed; and the like.

Figure 2:
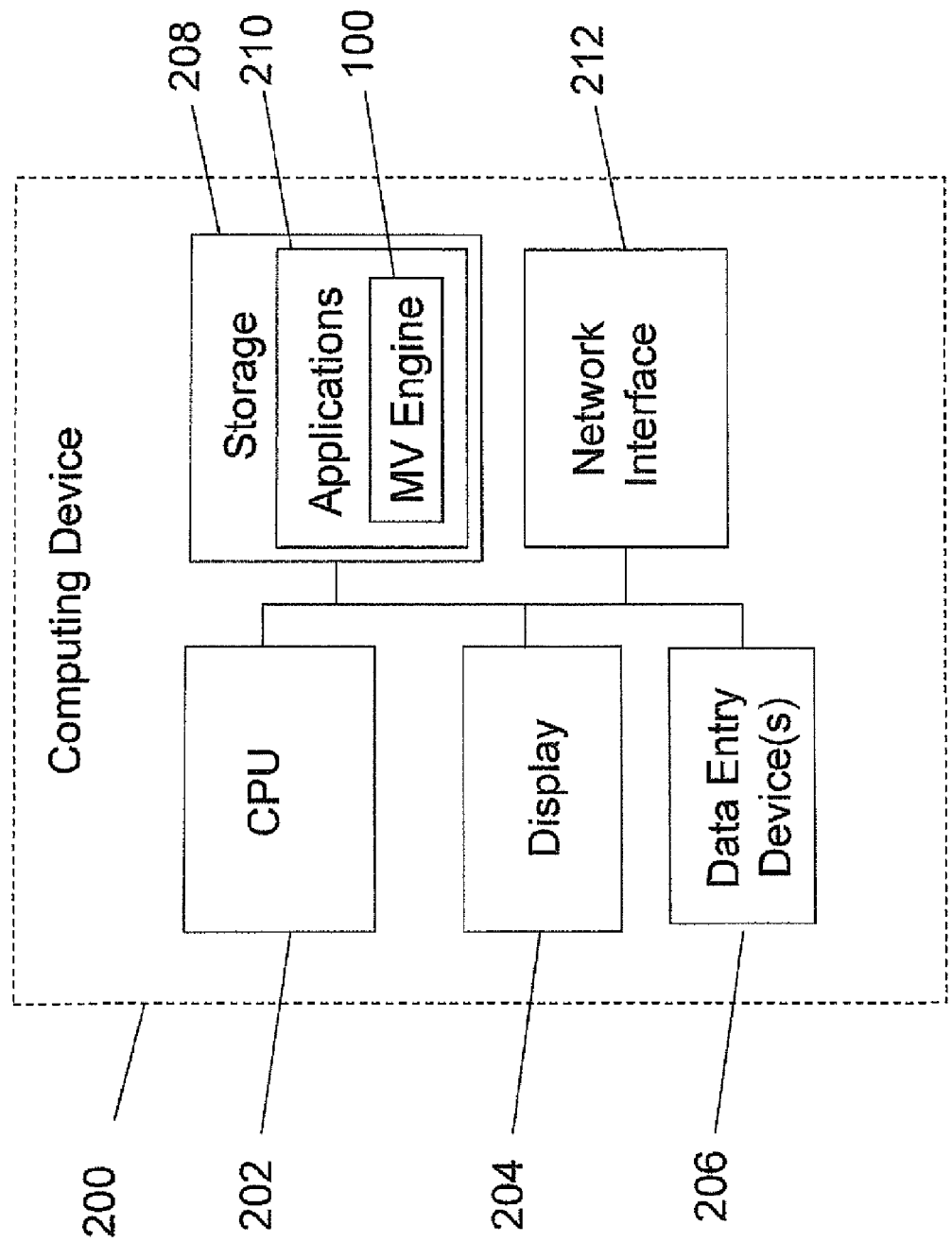
FIG. 2 depicts an exemplary computing device for implementing embodiments of the MV engine.

FIG. 2 depicts an exemplary computing device 200 for determining media value for entities of interest using the MV engine 100. The computing device 200 can be a mainframe; personal computer (PC); laptop computer; workstation; handheld device, such as a PDA and/or smart phone; and the like. In the illustrated embodiment, the computing device 200 includes a central processing unit (CPU) 202 and can include storage 204 for storing data and instructions. The storage 204 can include computer readable medium technologies, such as a floppy drive, hard drive, compact disc, tape drive, Flash drive, optical drive, read only memory (ROM), random access memory (RAM), and the like. The computing device can include a display device 206 that enables the computing device 200 to communicate with user through a visual display and can include data entry device(s) 208, such as a keyboard, touch screen, microphone, and/or mouse.

Applications 210, including the MV engine 100, can be resident in the storage 204. The applications 210 can include instructions for implementing the MV engine 100. The instructions can be implemented using, for example, C, C++, Java, JavaScript, Basic, Perl, Python, assembly language, machine code, and the like. The storage 204 can be local or remote to the computing device 200. The computing device 200 includes a network interface 212 for communicating with a network. The CPU 202 operates to run the applications 210 in storage 204 by executing instructions therein and storing data resulting from the performed instructions, which may be output via a display 206 or by other mechanisms known to those skilled in the art, such a print out from a printer.

Figure 3:
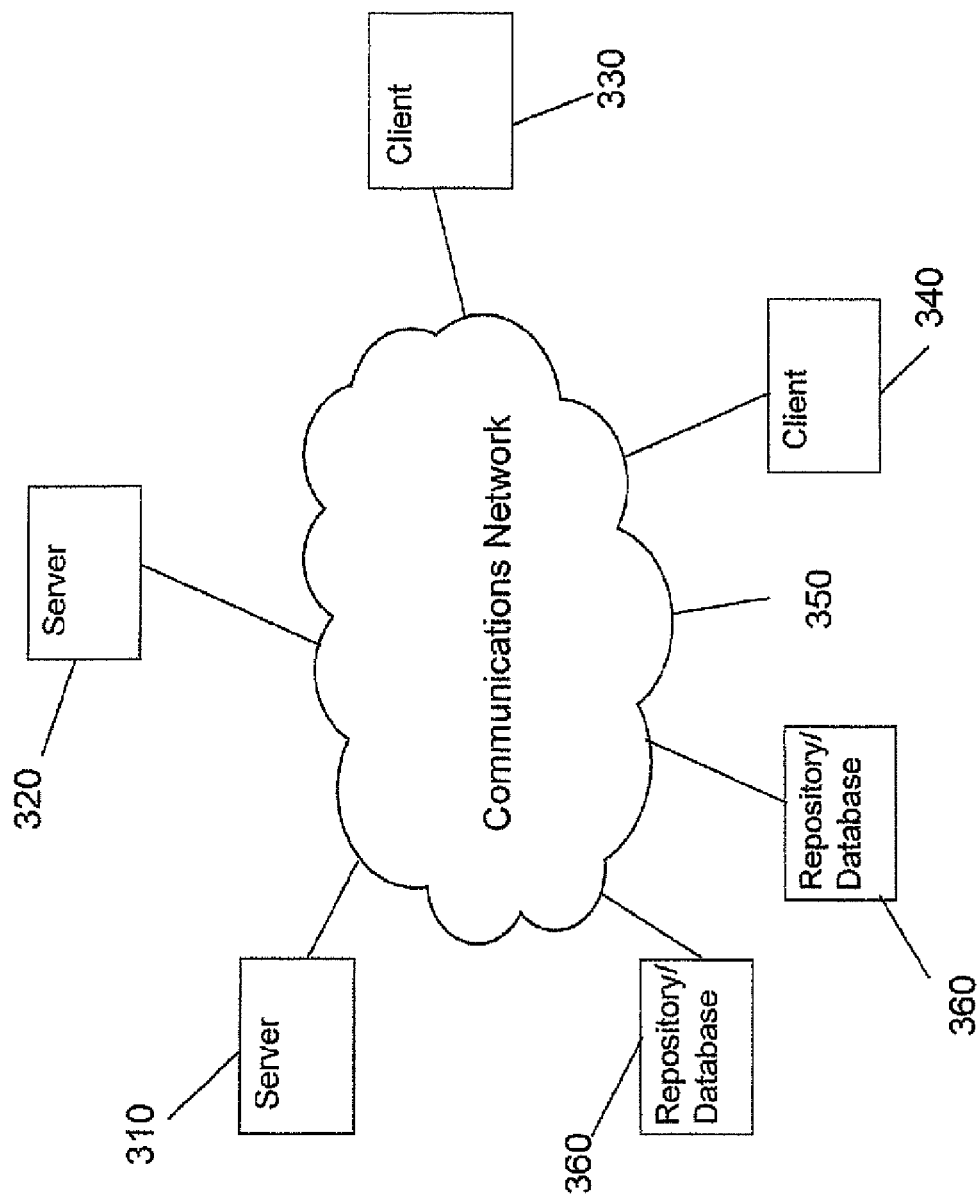
FIG. 3 depicts an exemplary computing system for implementing embodiments of the MV engine in a networked environment.

FIG. 3 is an exemplary networked computing system 300 for implementing embodiments of the MV engine. The computing system 300 includes one or more servers 310 and 320 coupled to clients 330 and 340, via a communication network 350, which can be any network over which information can be transmitted between devices communicatively coupled to the network. The system 300 can also include repositories or database devices 360, which can be coupled to the servers 310/320 and clients 330/340 via the communications network 350. The servers 310/320, clients 330/340, and database devices 360 can be implemented using a computing device.

The servers 310/320, clients 330/340, and/or databases 360 can store information, such as sentiment attributed to one or more entities mentioned in a corpus of documents; media value associated with one or more entities mentioned in the corpus of documents; a list of entities to be automatically identified in the corpus of documents; a sentiment lexicon; and the like. In some embodiments, the MV engine 100 can be distributed among the servers 310/320, clients 330/340, and database devices 360 such that one or more components of the MV engine 100 and/or portion of one or more components of the MV engine 100 can be implemented by a different device (e.g. clients, servers, databases) in the communication network 350. For example, in some embodiments, the entity identifier 110 and the sentiment analyzer can be resident on the server 310, the MV calculator 130 can be resident on the server 320, the output generator 140 can be resident on the clients 330 and 340. One or more of the databases 360 can serve of the MV database to store entity information, sentiment and polarity information, media value information, media value reports, a corpus of documents, and the like. Those skilled in the art will recognize that the distribution of components of the MV engine is illustrative and that different distributions of the components of the MV engine can be implemented.

Figure 4:
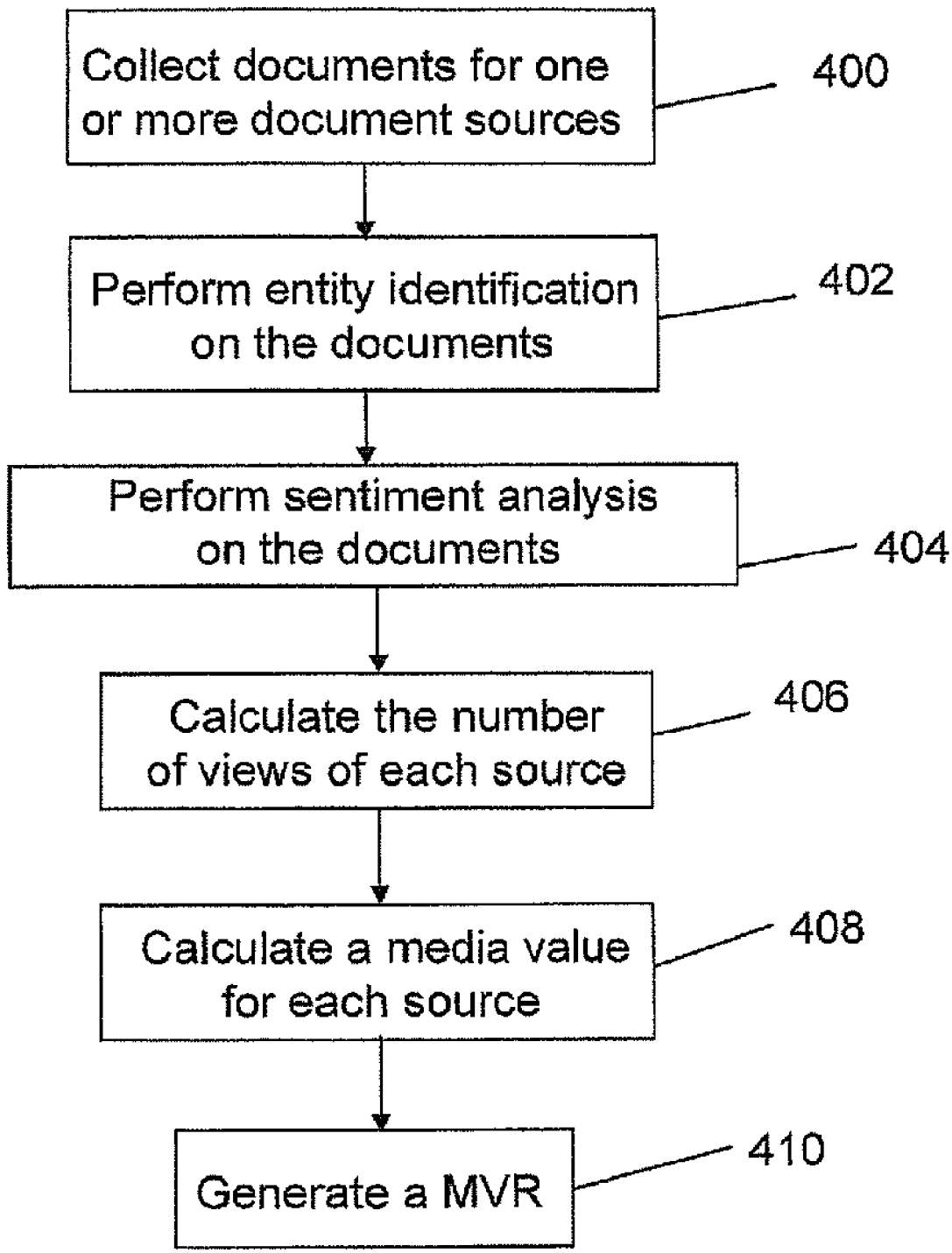
FIG. 4 is a flowchart illustrating a process of determining media value for entities of interest and generating a media value reporting using the media value.

FIG. 4 is an exemplary flowchart illustrating an exemplary process for determining media value and generating an media value output. To begin, the MV engine can collect documents for one or more document sources (400). Documents are collected in a manner that is appropriate for their domain. For example, Twitter documents are collected using Twitter's published application program interfaces (API's) and newspaper articles are collected by programs that download and clean-up webpages from the newspapers website. Once the MV engine has collected the documents, the MV engine performs entity identification on the documents (402) and performs sentiment analysis of the documents (404). Entity Identification identifies occurrences of entities of interest (names of people, companies, consumer brands, etc.) in the documents. Sentiment analysis identifies the expression of opinion and the polarity of that opinion in the documents and attributes that sentiment to the identified entities.

The MV engine looks at each publication source in the corpus, and determines, based on source specific information, the number of people that a document published by that source is exposed (406). For example, for a newspaper article, the circulation of the newspaper in which the article was published is approximately the number of people to which the article was exposed. The MV engine takes the exposure of the documents sources and the attributed sentiment of the documents and calculates the media value attributed to the entity in each document source (408). The media value for each document source, on each day in a specified time frame can be used to produce an output, such as a MVR or a display on a dashboard (e.g., a web-based user interface), containing time series of media value over the time period, document sources ranked by value created, a total amount of media value generated by the entity over the date range, and the like (410).

Figure 5:
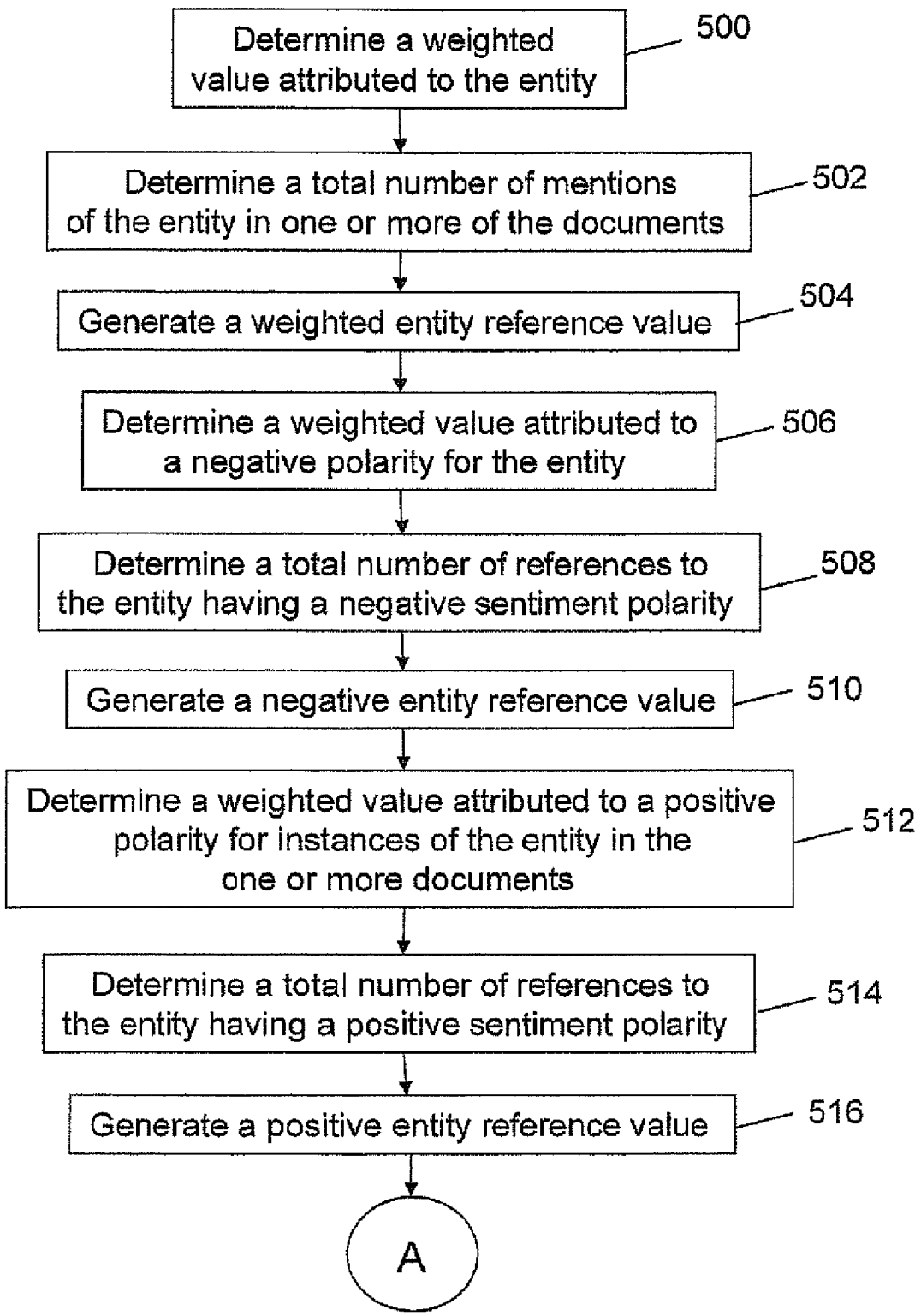
FIG. 5 is a flowchart illustrating calculating media value for an entity based on sentiment attributed to the entity in one or more documents.
Figure 5:
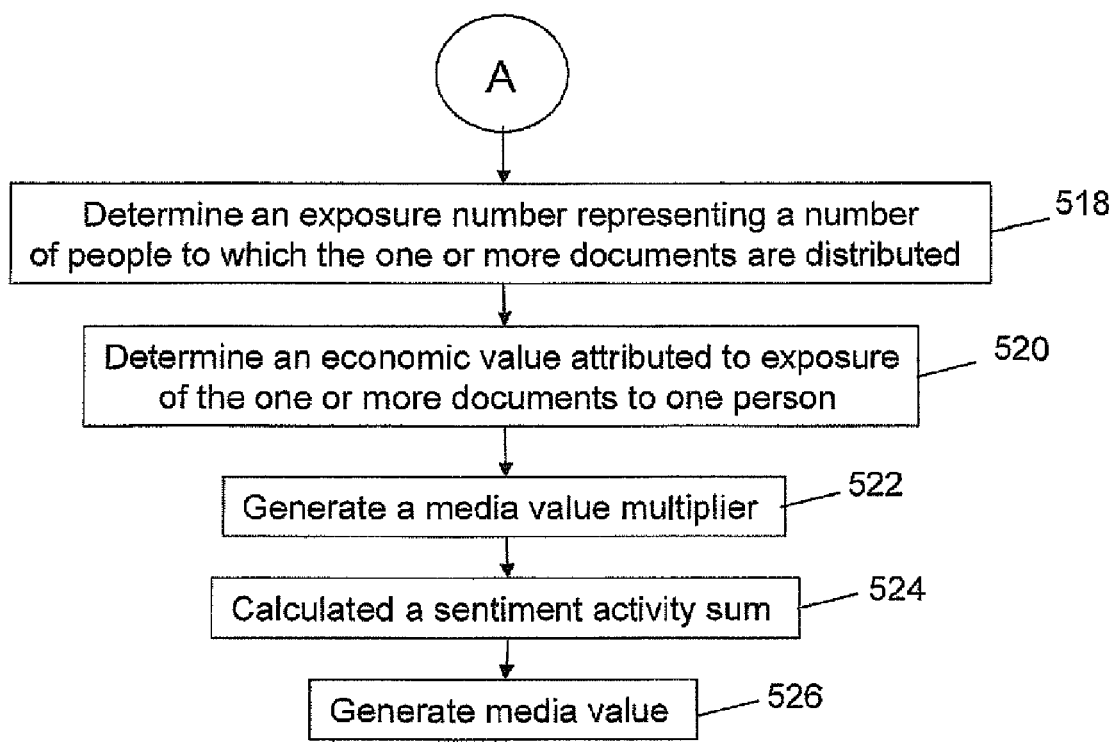

FIG. 5 is a flowchart illustrating an exemplary calculation of the media value for an entity based on sentiment attributed to the entity in one or more documents. The MV engine can determine a weighted value attributed to the entity (500) and can determine a total number of mentions or occurrences of the entity in one or more of the documents (502). The weighted value attributed to the entity can be multiplied by the total number of references to the entity in one or more of the documents to generate a weighted entity reference value (504).

The MV engine can determine a weighted value attributed to a negative polarity for the entity (506) and can determine a total number of references to the entity having a negative sentiment polarity (508). The weighted value attributed to the negative polarity can be multiplied by the total number of references to the entity having the negative sentiment polarity to generate a negative entity reference value (510). The total number of mentions or occurrences of the entity that have a negative sentiment polarity can be determined with respect to a specified document source during a specified date of publication range.

The MV engine can determine a weighted value attributed to a positive polarity for instances of the entity in the one or more documents (512) and can determine a total number of references to the entity having a positive sentiment polarity. The weighted value attributed to the positive polarity can be multiplied by the total number of references to the entity having the positive sentiment polarity to generate a positive entity reference value (514). The total number of mentions or occurrences of the entity that have a positive sentiment polarity can be determined with respect to a specified source during a specified date of publication range.

The MV engine can determine an exposure number representing a number of people to which the one or more documents are distributed (516) and can determine an economic value attributed to exposure of the one or more documents to one person (518). The exposure number can be multiplied by the economic value to generate a media value multiplier (520).

A sentiment activity sum can be calculated by adding the weighted entity reference value, the negative entity reference value, and the positive entity reference value (522). The media value attributed to mentions or occurrences of the entity in one or more documents can be generated by multiplying the sentiment activity sum by the media value multiplier (524). Those skilled in the art will recognize the order in which the calculation of the media value is calculated can vary and that the ordered described with respect to FIG. 5 is illustrative of an exemplary media value calculation process.

Further, those skilled in the art will recognize that the media value can be calculated using various techniques and that the techniques described herein are illustrative an exemplary media value calculation process.

Figure 6:
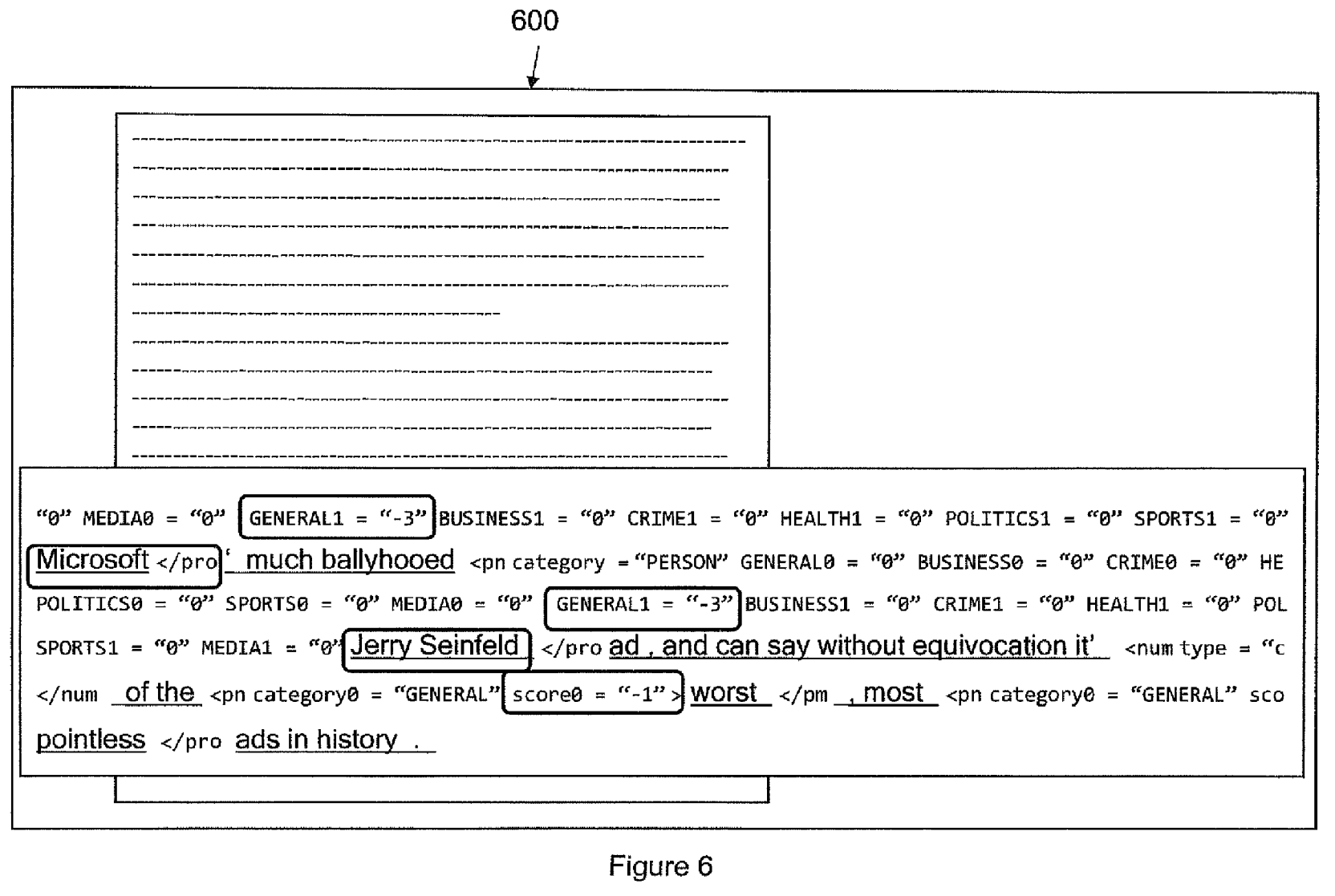

FIG. 6 is an extracted blow-up of an exemplary screenshot of a document 600 that has been marked-up by the MV engine. The document can include tags for identifying entities, sentiment attributed to the entities, a polarity of the sentiment attributed to the entities, and the like. For example, the MV engine can identify the entity "Microsoft" as being mentioned in the document and can associate a sentiment and polarity of the sentiment to the mention of "Microsoft". The MV engine can also associate the entity with a category of interest and can associate a sentiment value with the mention of the entity. For example, the MV engine can classify the entity "Microsoft" as a corporation.

Figure 7:
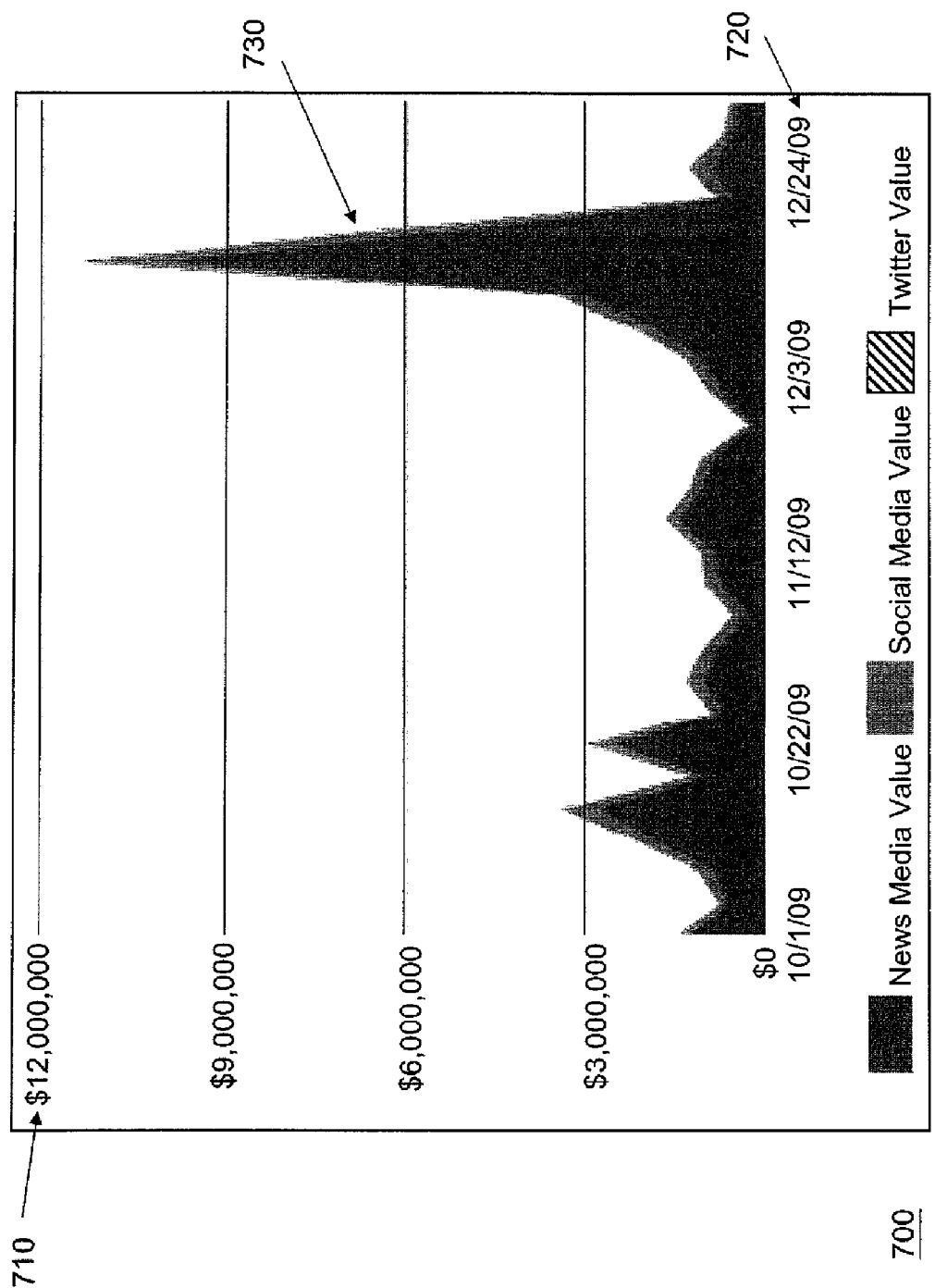
FIG. 7 is an exemplary graph that can be generated for outputting a media value generated by embodiments of the MV engine.

FIG. 7 is an exemplary graph 700 illustrating media value generated by the MV engine that can be included in a media value report (MVR), a dashboard (e.g., a web-based user interface), or in any other suitable format. The graph 700 can have a y-axis 710 representing a media value and an x-axis representing time over which a media value has been generated. A plot 730 of the media value versus time can be displayed in the graph 700. The plot 730 can identify a total media value over time for a corpus of documents, one or more document sources, specified documents, and the like. In the present example, the plot identifies the contribution of to the media value from three document sources: news media; social media; and Twitter.

What is claimed is:

1. A method of determining media value of an entity of interest comprising:
    calculating a media value based on a frequency of instances of the entity included in one or more documents,
    wherein calculating the media value is based on a sentiment associated with the instances of the entity included in the one or more documents,
    wherein calculating the media value comprises:
    determining a weighted value attributed to the entity;
    determining a total number of references to the entity in the one or more documents;
    multiplying the weighted value attributed to the entity by the total number of references to the entity in the one or more documents to generate a weighted entity reference value;
    determining a weighted value attributed to a negative polarity for the instances of the entity in the one or more documents;
    determining a total number of references to the entity having a negative sentiment polarity; and
    multiplying the weighted value attributed to the negative polarity by the total number of references to the entity having the negative sentiment polarity to generate a negative entity reference value.

2. The method of claim 1, wherein the total number of references to the entity having the negative sentiment polarity is determined for a specified source during a specified date of publication range.

3. The method of claim 1, wherein calculating the media value comprises:
    determining a weighted value attributed to a positive polarity for instances of the entity in the one or more documents;
    determining a total number of references to the entity having a positive sentiment polarity; and multiplying the weighted value attributed to the positive polarity by the total number of references to the entity having the positive sentiment polarity to generate a positive entity reference value.

4. The method of claim 3, wherein the total number of references to the entity having the positive sentiment polarity is determined for a specified source during a specified date of publication range.

5. The method of claim 3, wherein calculating the media value comprises:
  calculating a sentiment activity sum by adding the weighted entity reference value, the negative entity reference value, and the positive entity reference value.

6. The method of claim 5, wherein calculating the media value comprises
  determining an exposure number representing a number of people to which the one or more documents are distributed;
  determining an economic value per person attributed to exposure of the one or more documents; and
  multiplying the exposure number by the economic value to generate a media value multiplier.

7. The method of claim 6, wherein calculating the media value comprises:
  multiplying the sentiment activity sum by the media value multiplier to generate the media value attributed to the entity identified in the one or more documents.

8. A system for determining media value of an entity of interest comprising:
  a computing system having one or more computers, the computing system being configured to calculate a media value based on a frequency of instances of the entity included in one or more computer documents,
  wherein calculating the media value is based on sentiment associated with instances of the entity included in one or more computer documents and
  wherein calculating the media value comprises:
  determining a weighted value attributed to the entity;
  determining a total number of references to the entity in the one or more computer documents;
  multiplying the weighted value attributed to the entity by the total number of references to the entity in the one or more computer documents to generate a weighted entity reference value,
  determining a weighted value attributed to a negative polarity for the instances of the entity in the one or more documents;
  determining a total number of references to the entity having a negative sentiment polarity; and
  multiplying the weighted value attributed to the negative polarity by the total number of references to the entity having the negative sentiment polarity to generate a negative entity reference value.

9. The system of claim 8, wherein the one or more computer documents are published within a specified time range.

10. The system of claim 8, wherein calculating the media value further comprises:
  determining an exposure number representing a number of people to which the one or more computer documents are distributed;
  determining an economic value per person attributed to exposure of the one or more computer documents; and
  multiplying the exposure number by the economic value to generate a media value multiplier.

11. The system of claim 8, wherein the total number of references to the entity having the negative sentiment polarity is determined for a specified source during a specified date of publication range.

12. The system of claim 8, wherein calculating the media value comprises:
  determining a weighted value attributed to a positive polarity for instances of the entity in the one or more documents;
  determining a total number of references to the entity having a positive sentiment polarity; and
  multiplying the weighted value attributed to the positive polarity by the total number of references to the entity having the positive sentiment polarity to generate a positive entity reference value.

13. The system of claim 12, wherein the total number of references to the entity having the positive sentiment polarity is determined for a specified source during a specified date of publication range.

14. The system of claim 12, wherein calculating the media value comprises:
  calculating a sentiment activity sum by adding the weighted entity reference value, the negative entity reference value, and the positive entity reference value.

15. The system of claim 14, wherein calculating the media value comprises
  determining an exposure number representing a number of people to which the one or more documents are distributed;
  determining an economic value per person attributed to exposure of the one or more documents; and
  multiplying the exposure number by the economic value to generate a media value multiplier.

16. The system of claim 15, wherein calculating the media value comprises:
  multiplying the sentiment activity sum by the media value multiplier to generate the media value attributed to the entity identified in the one or more documents.

* * * * *